Oct. 16, 1962   H. F. GORHAM   3,058,255
FISHING ROD TIPS
Filed Jan. 19, 1960
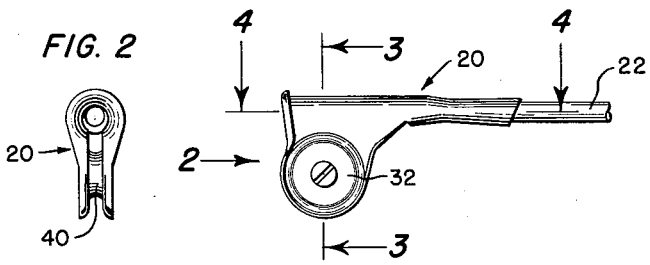
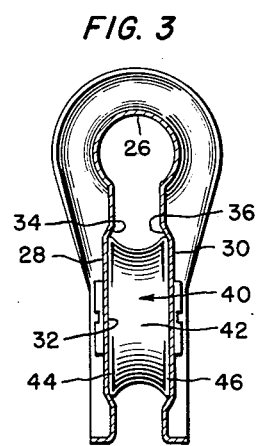
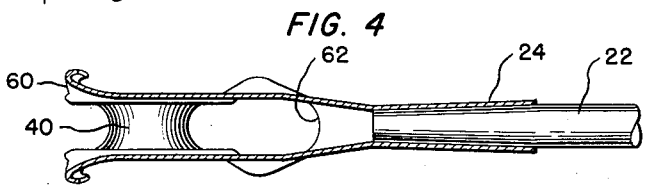
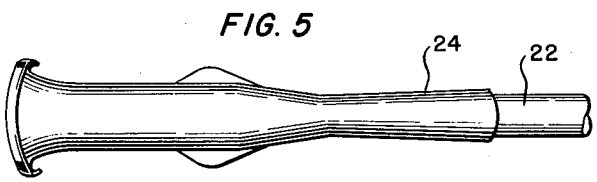
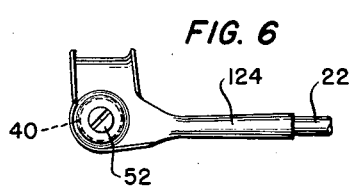
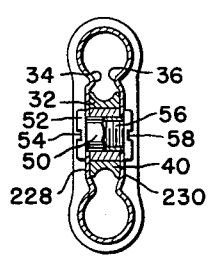
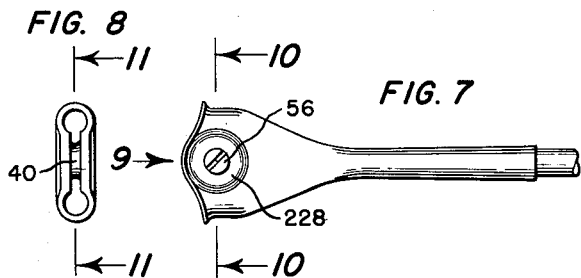
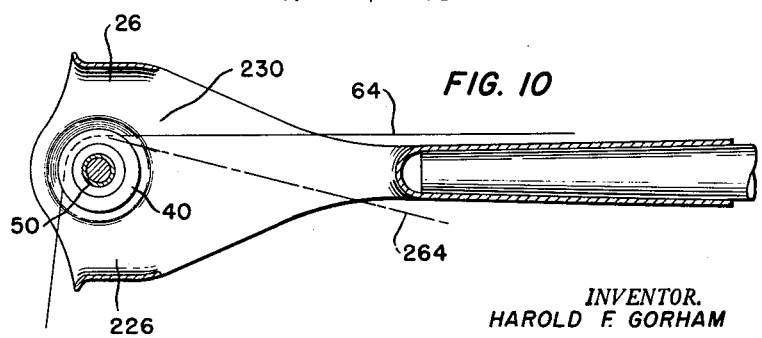
INVENTOR.
HAROLD F. GORHAM
BY Fulwider, Mattingly
& Huntley
ATTORNEYS United States Patent Office 3,058,255
Patented Oct. 16, 1962

3,058,255
FISHING ROD TIPS
Harold F. Gorham, National City, Calif., assignor to Gorham Universal Manufacturing Company, Inc., San Diego, Calif., a corporation of California
Filed Jan. 19, 1960, Ser. No. 3,450
6 Claims. (Cl. 43—24)

The present invention relates to a fishing rod tip and more particularly to a fishing rod tip of the type which includes a pulley for the fishing line and an elongated guide immediately above the pulley.

In the various aspects of the present invention, the tips each includes a frame which is formed of sheet material including two parallelly spaced walls disposed longitudinally of the rod; these walls carry a pulley for the fishing line; these walls also merge with one another at a sufficient distance above the pulley to form a tubularly shaped guide for the line above the pulley.

The walls are joined or merge with a stem forming a portion of the end of the fishing rod.

In one aspect of the invention, the stem is aligned substantially with the tubular guide; this type is used in conjunction with a rod in which the fishing line is disposed below the rod, as for example when a "spinner" type reel is employed.

In another aspect of the invention, the stem is aligned substantially with the axis of the pulley; this type is used in conjunction with a rod in which the fishing line is disposed above the rod, as for example when the reel is normally on the top side of the rod.

In still another embodiment of the invention, two guides are provided on the tip; these guides are disposed one above the other and the axes thereof are disposed parallelly. This latter tip is used with a rod having a single reel seat, and this tip provides for using the rod in conjunction with either a standard type of reel, carried above the rod, or a spinner type, carried below the rod. This construction provides a guide and a pulley therebelow for a fish line threaded above the rod and provides a guide and a pulley therebelow for a fish line threaded below the rod.

The advantages will be apparent from the following description, reference being had to the accompanying drawings wherein preferred embodiments of the invention are illustrated.

In the drawings:

FIG. 1 is a side view of a tip showing one aspect of the invention;

FIG. 2 is an end view of the tip shown in FIG. 1, looking in the direction of arrow 2 of FIG. 1;

FIG. 3 is a sectional view taken on line 3—3 of FIG. 1, but on a larger scale;

FIG. 4 is a sectional view taken on line 4—4 of FIG. 1, but on a larger scale;

FIG. 5 is a top plan view of the tip shown in FIG. 1 but on a larger scale;

FIG. 6 is a side view of another aspect of the invention;

FIG. 7 is a side view of still another aspect of the invention, the form employing two guides;

FIG. 8 is an end view looking in the direction of arrow 9 of FIG. 7;

FIG. 9 is a sectional view taken on line 10—10 of FIG. 7 but on a larger scale; and FIG. 10 is a sectional view taken substantially along line 11—11 of FIG. 8.

Referring more in detail to the drawings, the tip 20 may be merged with or be formed integrally with the end of the fishing rod 22, but in the preferred embodiment, as is more clearly shown in FIG. 4, the tip is provided with a hollow or elongated tubularly shaped stem 24 for receiving the end of the rod 22.

The tip 20 is preferably formed of sheet material which may be of plastic or metal, shaped to form the stem 24, a tubular guide 26, and side walls 28 and 30. These side walls extend longitudinally of the stem 24 and the rod 22 and are disposed parallelly of and in confronting relationship with one another so as to provide a pulley supporting section 32, as is more clearly shown in FIG. 3. The side walls are depressed outwardly to form circular beads 34 and 36.

A pulley 40 is disposed in the pulley section 32. This pulley is preferably of the spool type including the drum or root section 42 and the rims 44 and 46. The inner diameter of the beads 34 and 36 is slightly larger than the outer diameter of the rims 44 and 46. Also the beads 34 and 36 extend inwardly and partially overlie the rims 44 and 46.

Referring to FIG. 10, the pulley 40 is mounted on a hollow hub 50 having a head 52, and the head is provided with a screwdriver slot 54. The hub 50 is slightly longer than the combined width of the pulley 40 and the thicknesses of the side walls 28 and 30. The hub 50 is internally threaded to receive a screw 56 having a screwdriver slot 58. When the screw is fully tightened upon the end of the hub 50, there is sufficient clearance between the inside of the walls 28 and 30 and the outer walls of the rims 44 and 46 to permit the free spinning of the pulley 40.

It will be observed from FIGS. 4 and 5 that the sheet material is elongated longitudinally of the stem 24 to provide the elongated guide 26 and preferably the outer end is provided with a graceful curve or flare as at 60 to eliminate any sharp edges which would be apt to cut the fishing line. The tip shown in FIG. 1 is substantially full size, and it is important that the inner diameter of the guide be approximately ¼ inch. This may vary slightly with a tolerance of $\frac{1}{16}$ inch in either direction. If the guide is less than $\frac{3}{16}$ inch, the walls thereof offer too much resistance for the free passage of the fish line therethrough during the casting operation, and, if the diameter is more than $\frac{5}{16}$ inch, there is a tendency to permit excessive whipping of the line, often causing entanglements either on opposite sides or within the guide.

The embodiment shown in FIGS. 1 to 5 inclusive is for the type of fishing rod in which the line is disposed on the under side of the rod. This type of rod usually employs a spinner type reel. As will be seen from FIG. 4, sufficient clearance is provided between the ends of the guide, indicated, respectively at 62, and the flare 60, to prevent any sharp curvatures on behalf of the line as it passes from the stem portion 24 into the guide 26. After the line is cast, it will fall upon the drum section 42 of the pulley 40.

In the embodiment shown in FIG. 6, all of the essential parts are the same as those described with respect to FIGS. 1 to 5 inclusive and FIG. 9. In fact, the end view of the embodiment shown in FIG. 6 is the same as that shown in FIG. 2. In this aspect of the invention the stem 124, instead of being aligned with the guide, it and the end of the fishing rod 22 are aligned with the axis of the pulley 40. The head 52 is the same as that shown in FIG. 9. In this aspect of the invention, the tip is designed for use in a fishing rod in which the line is disposed above the rod, and in which a standard type reel is employed.

In the embodiment shown in FIGS. 7 to 10 inclusive, the side walls 228 and 230 are similar to the side walls 28 and 30 as shown in FIG. 3, but in this embodiment the side walls form two guides, the upper 26 having the same configuration as the guide 26 in FIG. 3, and the lower guide is indicated at 226. The guide 226 is of the same contour as guide 26 and may be said to be allochiral with respect to guide 26.

The embodiment shown in FIGS. 7 to 10 inclusive, is used when it is desirable that the fishing rod be used either with a standard type of reel or with a spinner type of reel. The rod is provided with only one seat for a reel. This seat will be at the top when using a standard type reel and at the bottom when using a spinner type reel. In order for the line 64 to rest upon the drum section 42 of the pulley 40 after casting, when either the spinner type or standard type of reel is employed, two guides are necessary. The line 64 in FIG. 10 is shown as threaded when a standard type reel is employed. When the spinner type reel is employed, the line is diagrammatically shown by the dash and dot line 264. While the line 264 is shown as passing over the pulley between the guide 26 and the pulley, it is to be understood that at this time, the positions of guides 26 and 226 will be reversed, yet the line 264 will be riding on the pulley and will be disposed between the drum section 42 and the guide 226.

It will be observed from the drawing that the side walls 28 and 30 of the pulley supporting section 32 lie immediately adjacent the sides of the pulley 40 at the periphery of said pulley sides. It will also be observed from the drawing that the beads extend radially and inwardly from the side walls 28 and 30 and are in immediate surrounding relationship with the rim of the pulley. Such construction guides the fishing line onto the pulley and prevents the line from entering between the outer side wall of a pulley and the inner side wall of the sheet material.

It will also be observed that the width of the pulley is substantially less than the diameter of the tubular guide. As previously set forth, the tubular guide should have sufficient diameter for the fishing line; otherwise it could not be used for casting purposes. Too, the pulley must be capable of rotation by an exceptionally light contact with a moving fishing line. To accomplish this, the pulley of the present invention is formed with a small width relative to the diameter of the tubular guide, thus materially reducing the friction between the bearing surfaces of the pulley and the hub therefor.

The forming of the beads and the minimizing of the bearing lengths are accomplished by flaring the confronting walls inwardly radially of the pulley section to form the beads for the rim of the pulley and then outwardly to a greater extent than the inward extension to form the enlarged tubular guide.

While the forms of embodiments herein shown and described constitute preferred forms, it is to be understood that other forms may be adopted falling within the scope of the claims that follow.

I claim:
1. A fishing rod tip comprising:
(A) A sheet of metal forming;
   (a) an elongated horizontally extending stem for attachment to the end of a horizontally extending fishing rod,
   (b) said stem merging into two upright confronting walls, said walls being disposed parallelly of the stem;
(B) and a pulley disposed and carried by said confronting upright walls on an axis at right angles to said walls,
   (c) said confronting walls being immediately adjacent the sides of the pulley at the periphery of said pulley sides,
   (d) said sheet metal flaring inwardly radially immediately about the periphery of the rims of the pulley and then flaring outwardly to a greater extent than the inward flaring, and
   (e) forming, in conjunction with the periphery of the pulley, a horizontally extending tubular guide for horizontally surrounding a fishing line,
   (f) said guide having a larger diameter than the width of the pulley,
   (g) and extending outwardly from the stem beyond a vertical line through the axis of the pulley.

2. A fishing rod tip as defined in claim 1, in which the inside diameter of the tubularly shaped guide is approximately one-quarter of an inch in horizontal cross-section.

3. A fishing rod tip as defined in claim 1, in which the pulley is substantially aligned with the stem.

4. A fishing rod tip as defined in claim 3, in which the inside diameter of the tubularly shaped guide is approximately one-quarter of an inch in horizontal cross-section.

5. A fishing rod as defined in claim 3, in which a second tubular guide is formed in the same manner as the first mentioned tubular guide, said tubular guides lying on opposite sides of the periphery of the pulley.

6. A fishing rod tip as defined in claim 5, in which the inside diameters of the tubularly shaped guides are approximately one-quarter of an inch in horizontal cross-section.

References Cited in the file of this patent

UNITED STATES PATENTS

| | | |
|---|---|---|
| 899,914 | Smith | Sept. 29, 1908 |
| 1,142,796 | Brugman | June 15, 1915 |
| 1,835,310 | Kline et al. | Dec. 8, 1931 |
| 1,959,989 | Reynolds | May 22, 1934 |
| 2,502,846 | Hoffman | Apr. 4, 1950 |
| 2,878,608 | O'Brien | Mar. 24, 1959 |

FOREIGN PATENTS

| | | |
|---|---|---|
| 971,788 | France | Aug. 16, 1950 |
| 1,116,582 | France | Feb. 6, 1956 |
| 1,122,825 | France | Sept. 13, 1956 |